United States Patent [19]
Brudermann et al.
[11] 4,436,320
[45] Mar. 13, 1984

[54] CHASSIS FOR INVALID WHEELCHAIRS

[75] Inventors: Uwe Brudermann, Heikendorf; Karl-H. Kunze; Gunter Krehl, both of Kiel; E. Volker Linde, Klausdorf; Dieter R. Lorenz, Kiel, all of Fed. Rep. of Germany

[73] Assignee: Everest & Jennings, Inc., Camarillo, Calif.

[21] Appl. No.: 373,740

[22] Filed: Apr. 30, 1982

[30] Foreign Application Priority Data

May 7, 1981 [DE] Fed. Rep. of Germany ..... 31118112

[51] Int. Cl.[3] .............................................. B62M 1/14

[52] U.S. Cl. ...................... 280/242 WC; 180/DIG. 3; 297/DIG. 4

[58] Field of Search ............... 280/242 WC, 289 WC, 280/47.38, 650, 794, 209; 180/DIG. 3, 9.58; 297/281, DIG. 4

[56] References Cited

U.S. PATENT DOCUMENTS 565,443 8/1896 Eells .................................... 280/209
636,155 10/1899 Mackay ............................... 280/209
4,030,769 6/1977 Peng et al. ......................... 280/650
4,360,213 11/1982 Rudwick et al. ........... 280/242 WC

*Primary Examiner*—John A. Pekar
*Assistant Examiner*—D. Lynn Fugate
*Attorney, Agent, or Firm*—Ralph B. Pastoriza

[57] ABSTRACT

The chassis features left and right lateral frames rotatably supporting at their front and rear ends front and rear wheels. The rear wheels are pivoted for steering. First and second connecting members arranged in a cross and lying in a horizontal plane extend between and are attached to the lateral frames to confine the movements of the lateral frames into predominantly parallel planes. A third connecting member extends horizontally between and is attached to the lateral frames in a position spaced above the horizontal plane so that when the chassis is viewed from the side at the most only two frame mounting points fall on a straight line. Elastic relative movement between the left and right lateral frames is achieved as a result of the inherent elasticity of the connecting members and in addition resilient mountings at the attachment points of the connecting members to the lateral frames.

9 Claims, 3 Drawing Figures

CHASSIS FOR INVALID WHEELCHAIRS

FIELD OF THE INVENTION

This invention relates generally to wheelchairs and more particularly to an improved chassis for roll-around type invalid chairs, usually of the power-driven type.

BACKGROUND OF THE INVENTION

The chassis of most prior art roll-around invalid chairs are generally of a rigid construction. Wheels in turn are independently suspended and spring loaded. Jolts created by an uneven road surface are largely prevented from reaching the person seated in the invalid chair as a consequence of this independent suspension. However, all four wheels should at all times have cntact with the road surface as an essential safety criterion.

Such known constructions as described above are relatively complicated as they are dictated by the requirement of the independent wheel suspension. Also, the presently available steering arrangements further complicate the existing structures.

BRIEF DESCRIPTION OF THE PRESENT INVENTION

The present invention combines the advantages of independent wheel suspension, without having to actually provide such independent wheel suspension but rather a chassis of very simple construction constructed in such a manner that inherent elasticity provides for the same type of comfortable ride as would result with independent wheel suspension.

More particularly, in accord with the present invention, the chassis includes left and right lateral frames rotatably supporting at their forward and rear ends front and rear wheels respectively. These lateral frames lie in spaced generally vertical parallel planes.

First and second connecting members arranged in a cross, lying generally in an horizontal plane between the vertical parallel planes are provided with their extending ends being attached to the lateral frames. In the simplest embodiment, there is also provided a third connecting member extending horizontally between and attached to the lateral frames in a position spaced above the horizontal plane, the third connecting member being normal to the vertical planes so that when the chassis is viewed from the side, at the most only two frame mounting points fall on a straight line. The first and second connecting members together with their attachment points to the lateral frames permit elastic relative movement between the lateral frames.

More particularly with respect to the above, with the crosswise arranged connecting members, a displacement of the left and right lateral frames is only possible within their own vertical planes, that is, planes perpendicular to the horizontal plane formed by the crossed connecting members provided that the junction of the connecting members is held in a manner to permit it to swivel as a whole around an axis which is perpendicular to the horizontal plane. The result is a combination of a rotating and shifting movement. The purpose for the third connecting member is to stabilize the whole construction and to keep the two left and right lateral frames properly spaced.

In those instances where the crossed connecting members are held together at their cross-over points solely by means of an encircling ring, there is provided a fourth connecting member in the form of a rigid bar. This fourth connecting member is attached to the left and right lateral frames in such a way as to prevent shifting of the first and second crossing connecting members, relative to each other.

BRIEF DESCRIPTION OF THE DRAWINGS

A better understanding of this invention will be had by referring to a specific embodiment thereof as schematically illustrated in the accompanying drawings in which.

DETAILED DESCRIPTION OF THE INVENTION

Figure 1:
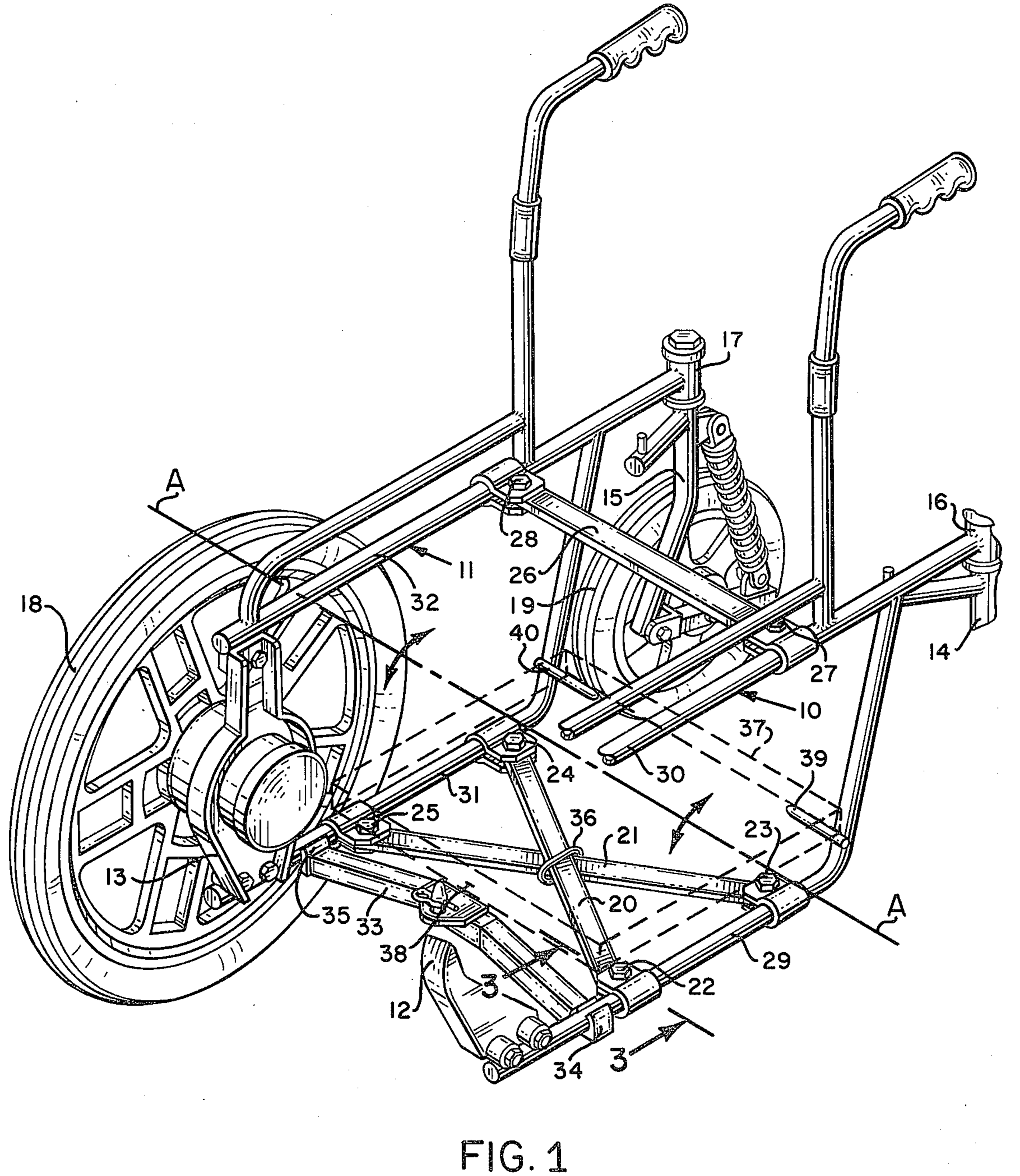
FIG. 1 is a fragmentary perspective view of the chassis of this invention.

Referring first to FIG. 1, there are designated generally by the numerals 10 and 11 left and right lateral frames. These frames rotatably support at their forward and rear ends 12, 13 and 14, 15 front and rear wheels. In the particular embodiment illustrated, the rear ends 14 and 15 include swivel arrangements received within swivel sockets 16 and 17 respectively so that the rear wheels can swivel in the manner of castor wheels for steering purposes.

In FIG. 1, one of the front wheels is shown at 18 and one of the steerable rear wheels is shown at 19.

The left and right lateral frames supporting the forward and rear wheels lie in spaced generally vertical parallel planes.

Referring to the central portion of the chassis of FIG. 1, there are shown first and second connecting members 20 and 21 arranged in a cross lying generally in horizontal plane between the foregoing referred to vertical planes, the extending ends of these members being attached to the lateral frames as at 22, 23, 24 and 25.

A third connecting member 26 extends horizontally between and attaches to the lateral frames as at 27 and 28 in a position spaced above the horizontal plane of the first and second connecting members. This third member is normal to the vertical planes of the left and right lateral frames 10 and 11 so that when the chassis is viewed from the side, at the most only two framed mounting points fall on a straight line. For example, the mounting points 22 and 23 for the first and second connecting members 20 and 21 will fall on a straight line but the mounting point 27 for the third connecting member 26 does not fall on this line.

With respect to the above, each of the lateral frames 10 and 11 includes a lower horizontal spar and an upper horizontal spar parallel to each other such as indicated at 29 and 30 for the left lateral frame 10 and 31 and 32 for the right lateral frame 11. The respective extending ends of the first and second connecting members attach to the lower spars as shown at 22, 23, 24 and 25, while the third connecting member is attached at 27, and 28 to the upper spars.

In the specific embodiment illustrated in FIG. 1, the chassis is completed by the provision of a fourth connecting member 33 extending generally horizontally between and attached to the lower spars 29 and 31 on the left and right lateral frames as at 34 and 35. Essentially, this fourth connecting member lies in the same horizontal plane as the first and second connecting members 20 and 21.

The fourth connecting member 33 is preferably in the form of a stiff bar and is provided in the event that only an encircling ring or equivalent clamp-like structure is provided about the cross-over point of the first and second connecting members. For example, and as shown in FIG. 1, this cross-over point of the first and second connecting members 20 and 21 is encircled by a ring 36 so that slight rotation of the first and second members about a vertical axis; that is, an axis normal to the horizontal plane can take place. The fourth bar 33 serves to stabilize the left and right frames as a consequence of this particular freedom of movement.

It will be noted in the embodiment of FIG. 1, that the first, second and third connecting members 20, 21 and 26 constitute essentially leaf springs thereby providing an elastic connection between the lateral frames permitting some slight rotations of the frames in their own planes about a horizontal axis, such axis being indicated at A—A in FIG. 1. However, the attachment points themselves as at 22, 23, 24, 25, 27 and 28 may be provided with intermediary resilient means to provide for further elasticity. Such means will be described subsequently.

The attachment points 34 and 35 for the fourth connecting bar 33 to the lower spars of the lateral frames, in turn, include means permitting pivoting movement over a few degrees about the axis of the spars and pivoting movement a few degrees about its own longitudinal axis. The fourth connecting member 33 will not have any adverse effect on the elastic behavior of the lateral frames 10 and 11. In fact, the fourth connecting member 33 does not have any elastic properties itself at all and in fact may be a rigid, hollow tubing.

Where the frame is used for a power wheelchair, there is a need to hold the battery for electrical propulsion and towards this end, there is indicated by the phantom lines a battery holder 37 in the form of a rectangular frame. This holder is disposed above the first and second connecting members between the left and right lateral frames as shown. The front central edge of the holder is hinged to the fourth connecting member 33 as indicated at 38 and the rear portion of the lower spars 29 and 31 have inwardly protruding support pins 39 and 40 for supporting the rear edge of the battery holder. That is, the rear edge rests on these pins so as to be essentially freely floating on the pins in such a way as not to inhibit relative movement of the lateral frames.

Figure 2:
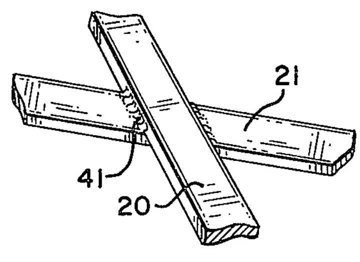
FIG. 2 is a fragmentary perspective view of a portion of the chassis of FIG. 1 showing a modified form of the invention; and, FIG. 3 is a fragmentary cross section taken in the direction of the arrows 3—3 of FIG. 1.

FIG. 2 illustrates at 41 a rigid permanent connection at the cross-over points of the members 20 and 21 in place of an encircling ring, such as the ring 36 of FIG. 1. When using such a permanent connection, it is necessary to definitely provide some type of elastic cushioning at the attachment end points of the first and second connecting members to the lower spars.

In FIG. 1, the attachment points include vertical bolts which will permit some slight pivotal movement about vertical axes of the attached ends of the connecting members 20 and 21. In addition, further cushioning or spring-like intermediary means can be provided.

Figure 3:
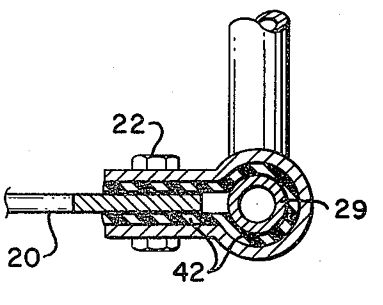

With respect to the foregoing, and with specific reference to FIG. 3, there is shown such initial cushioning means in the form of a rubber cushion 42 at the attachment point of the connecting member 20 with the lower spar 29; that is, the attachment point 22 described in FIG. 1. Similar rubber cushioning means corresponding to 42 would be provided at the other attachment points 23, 24, 25, 27 and 28, the latter two points constituting the attachment of the third connecting member 26 to the upper spars.

From all of the foregoing, it will be evident that a very simplified construction for providing a comfortable riding invalid wheelchair results. Essentially, the heart of the invention resides in the provision of the first and second connecting members in the form of leaf springs crossing over each other and the clamping of the springs by an encircling ring at their cross-over point. The resulting elasticity provides for the desired comfortable ride. The third connecting member 26 as described in FIG. 1, stabilizes the left and right lateral frame structures.

From all of the foregoing, it will now be evident that the present invention has provided a greatly improved chassis for invalid wheelchairs providing a ride equivalent to that afforded by independent wheel suspension.

We claim:

1. A chassis for invalid wheelchairs including, in combination:

(a) left and right lateral frames for rotatably supporting at their forward and rear ends front and rear wheels respectively, said lateral frames lying in spaced generally vertical parallel planes;

(b) first and second connecting members arranged in a cross, lying generally in an horizontal plane between said vertical parallel planes, the extending ends of said members being attached to said lateral frames; and (c) a third connecting member extending horizontally between and attached to said lateral frames in a position spaced above said horizontal plane, said third member being normal to said vertical planes, so that when said chassis is viewed from the side, at the most only two frame mounting points fall on a straight line, said first, second and third connecting members constituting leaf springs providing an elastic connection between the lateral frames permitting slight rotations of the frames in their own planes about an horizontal axis, the attachment points of said members to said lateral frames permitting further elastic relative movements between said lateral frames.

2. A chassis according to claim 1, in which each of said lateral frames includes a lower horizontal spar and an upper horizontal spar parallel to each other, the respective extending ends of said first and second connecting members being attached to the lower spars in the lateral frames and the third connecting member being attached to the upper spars in the lateral frames.

3. A chassis according to claim 2, including a fourth connecting member extending generally horizontally between and attached to said lower spars of the frames so as to lie in said horizontal plane of said first and second connecting members.

4. A chassis according to claim 3, in which said fourth connecting member is a stiff bar.

5. A chassis according to claim 3, including an encircling ring about the cross-over point of said first and second connecting members.

6. A chassis according to claim 2, in which the first second and third connecting members are attached to the lower and upper spars of the lateral frames by way of intermediary resilient means.

7. A chassis according to claim 3, in which the attachment points of the fourth connecting bar to the lower spars of the vertical frames include means permitting pivoting movement over a few degrees about the axis of the respective spars and pivoting movement a few degrees about the longitudinal axis of said fourth connecting bar.

8. A chassis according to claim 3, including a battery holder disposed above said first and second connecting members between said left and right lateral frames, said holder having a front central edge hinged to said fourth connecting member, the rear portion of said lower spars having inwardly protruding support pins upon which the rear corner edges of said battery holder rest so as to be essentially freely floating on the pins in such a way as not to inhibit relative movements of the lateral frames.

9. A chassis according to claim 6, in which said first and second connecting members are rigidly secured together at their cross-over point.

* * * * *